US012427630B1

(12) United States Patent
Shaw

(10) Patent No.: US 12,427,630 B1
(45) Date of Patent: Sep. 30, 2025

(54) BATTERY POWERED AUTOMATIC WRENCH

(71) Applicant: Anthony Shaw, Clinton, MD (US)

(72) Inventor: Anthony Shaw, Clinton, MD (US)

( * ) Notice: Subject to any disclaimer, the term of this patent is extended or adjusted under 35 U.S.C. 154(b) by 336 days.

(21) Appl. No.: 18/131,814

(22) Filed: Apr. 6, 2023

(51) Int. Cl.

| | |
|---|---|
| ***B25B 21/00*** | (2006.01) |
| ***B25B 23/00*** | (2006.01) |
| ***B25B 23/147*** | (2006.01) |
| ***B25B 23/16*** | (2006.01) |

(52) U.S. Cl.
CPC .......... *B25B 21/00* (2013.01); *B25B 23/0007* (2013.01); *B25B 23/147* (2013.01); *B25B 23/16* (2013.01)

(58) Field of Classification Search
CPC ..... B25B 21/00; B25B 21/002; B25B 21/004; B25B 23/0007; B25B 23/147; B25B 23/16
See application file for complete search history.

(56) References Cited

U.S. PATENT DOCUMENTS

| | | | | |
|---|---|---|---|---|
| 4,524,649 | A * | 6/1985 | Diaz | B25B 21/00 81/57.13 |
| 5,305,670 | A * | 4/1994 | Fossella | B25B 13/44 81/58.4 |
| 7,114,824 | B2 * | 10/2006 | Picone | B25B 13/14 362/120 |
| 7,444,902 | B1 * | 11/2008 | Lin | B25G 1/007 81/63.1 |
| 7,458,295 | B1 | 12/2008 | Lu | |
| 9,751,196 | B2 | 9/2017 | Hu | |
| 10,625,405 | B2 * | 4/2020 | Silha | B25B 21/004 |
| 10,751,860 | B2 * | 8/2020 | Hu | B25B 21/00 |
| 10,800,013 | B2 * | 10/2020 | Hu | B25B 13/463 |
| 11,034,012 | B2 * | 6/2021 | Fuchs | B25F 5/001 |
| 11,453,105 | B2 * | 9/2022 | Silha | B25B 23/147 |
| 11,484,998 | B2 * | 11/2022 | Hsu | B25B 13/06 |
| 11,529,720 | B2 * | 12/2022 | Kovacs, II | B25B 13/463 |
| 11,689,124 | B2 * | 6/2023 | Rajzer | B25F 5/00 318/17 |
| 11,752,604 | B2 * | 9/2023 | King | B60B 29/006 81/52 |
| 11,766,770 | B2 * | 9/2023 | Silha | B25B 13/10 81/52 |
| 11,787,025 | B2 * | 10/2023 | Gauthier | B25B 15/04 81/479 |
| 11,794,320 | B2 * | 10/2023 | King | B25B 23/1405 |

(Continued)

*Primary Examiner* — David B. Thomas
(74) *Attorney, Agent, or Firm* — Sanchelima & Associates, P.A.; Jesus Sanchelima; Christian Sanchelima

(57) ABSTRACT

A battery powered automatic wrench including a wrench assembly, an electric assembly, and a transmission assembly. The wrench assembly includes a handle that is removably attached to a wrench head. The electrical assembly includes a motor that can be regulated using a display and buttons disposed on the handle. A user can select a predetermined speed and torque for the motor to deliver it. The electrical assembly further includes a battery to power the motor and the display. The transmission assembly includes gears, spindles, a coupler, and toothed belt to transmit motion from the motor to a driving element partially housed by the wrench head. The driving element can receive different sized sockets that are suitable to fasten or loosen nuts, bolts, or the like.

14 Claims, 11 Drawing Sheets

(56) References Cited

U.S. PATENT DOCUMENTS

| | | | | |
|---|---|---|---|---|
| 2004/0226411 | A1* | 11/2004 | Hsien | B25B 21/004 81/57.13 |
| 2005/0090216 | A1* | 4/2005 | Hsu | B25B 21/004 455/184.1 |
| 2009/0114068 | A1* | 5/2009 | Lawrence | B25B 21/004 81/475 |
| 2020/0055174 | A1* | 2/2020 | Matei | B25F 3/00 |
| 2021/0122016 | A1* | 4/2021 | Hsu | B25B 23/147 |
| 2024/0157536 | A1* | 5/2024 | Stickney | B25B 21/004 |
| 2024/0198495 | A1* | 6/2024 | Lai | B25B 13/00 |

* cited by examiner

BATTERY POWERED AUTOMATIC WRENCH

BACKGROUND OF THE INVENTION

1. Field of the Invention

The present invention relates to a battery powered automatic wrench and, more particularly, to a battery powered automatic wrench that is detachable and has a transmission and an electrical assembly.

2. Description of the Related Art

Several designs for socket wrenches have been designed in the past. None of them, however, include a battery powered automatic wrench that has a motor internally disposed that can be controlled using a display. A user can select a predetermined speed or torque that the motor can deliver.

Applicant believes that a related reference corresponds to U.S. Pat. No. 7,458,295 issued for a motorized battery powered belt driven socket wrench. Applicant believes that another related reference corresponds to U.S. Pat. No. 9,751,196 issued for a battery powered electric socket wrench. None of these references, however, teach of a motorized battery powered automatic wrench comprising an elongated oval shaped handle with an internal electric motor and a battery storage compartment, which drives a gear that rotates a spindle to cause a belt to actuate the detachable wrench head wherein the handle has an electric display screen for increasing or decreasing the speed and the torque of the motor.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a battery powered assist to fasten or loosen mechanical elements such as nuts and bolts.

It is another object of this invention to provide a battery powered automatic wrench that is detachable to be easily stored.

It is still another object of the present invention to provide a battery powered automatic wrench that facilitates the assembly of different elements.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an operational view of the present invention 10 showing a user selecting a preferred configuration by means of the display.

Referring now to the drawings, where the present invention is generally referred to with numeral 10, it can be observed that it basically includes a socket wrench assembly 20, an electrical assembly 40, and a transmission assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
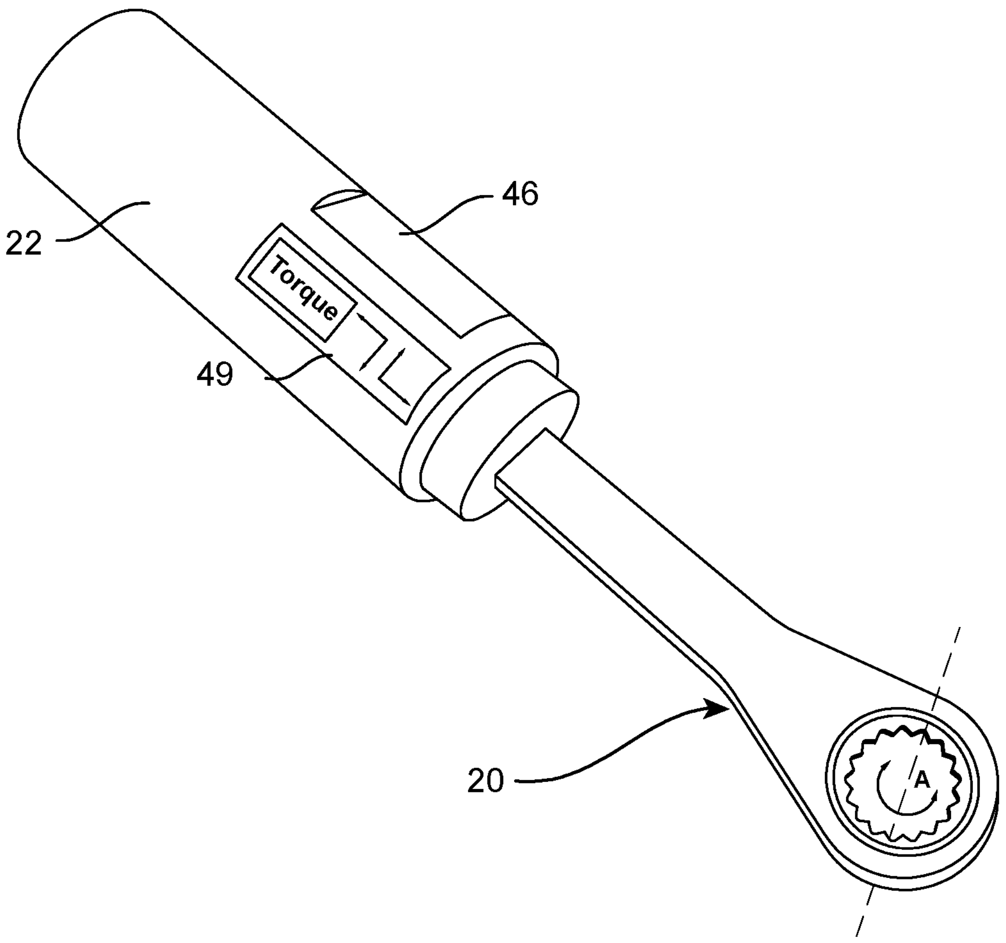
FIG. 2 shows an isometric view of the battery powered automatic wrench according to the present invention.
Figure 3:
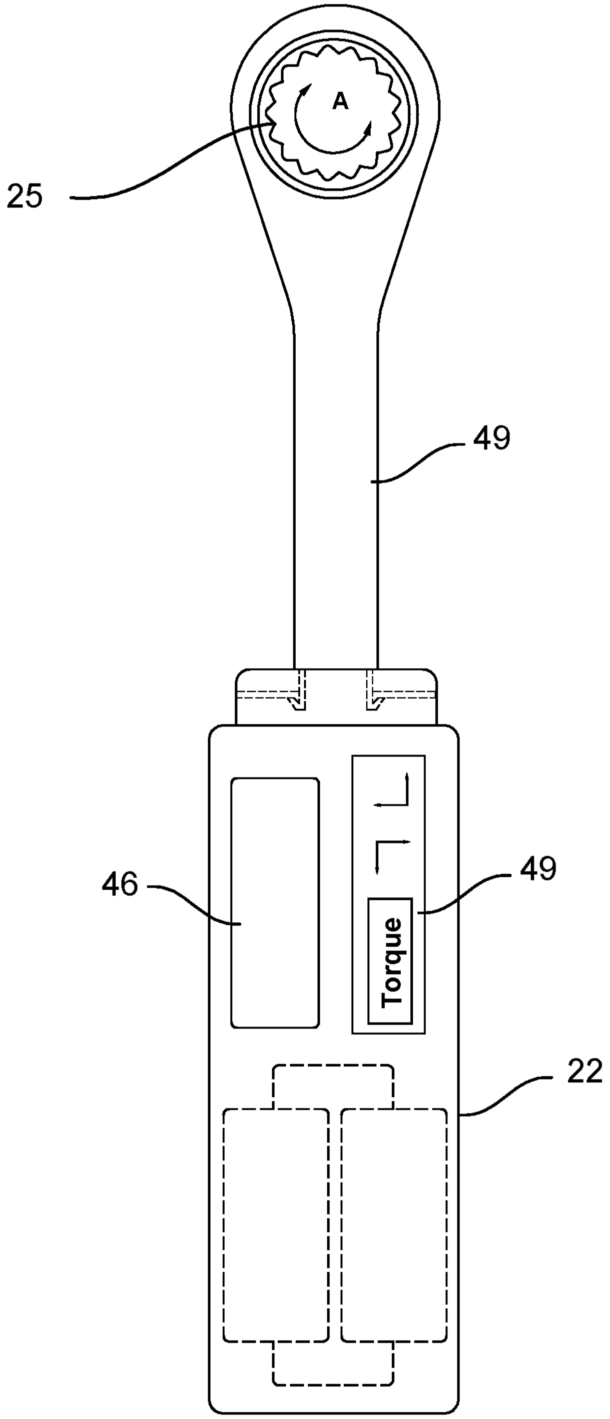
FIG. 3 illustrates a front internal view of the battery powered automatic wrench according to the present invention
Figure 4:
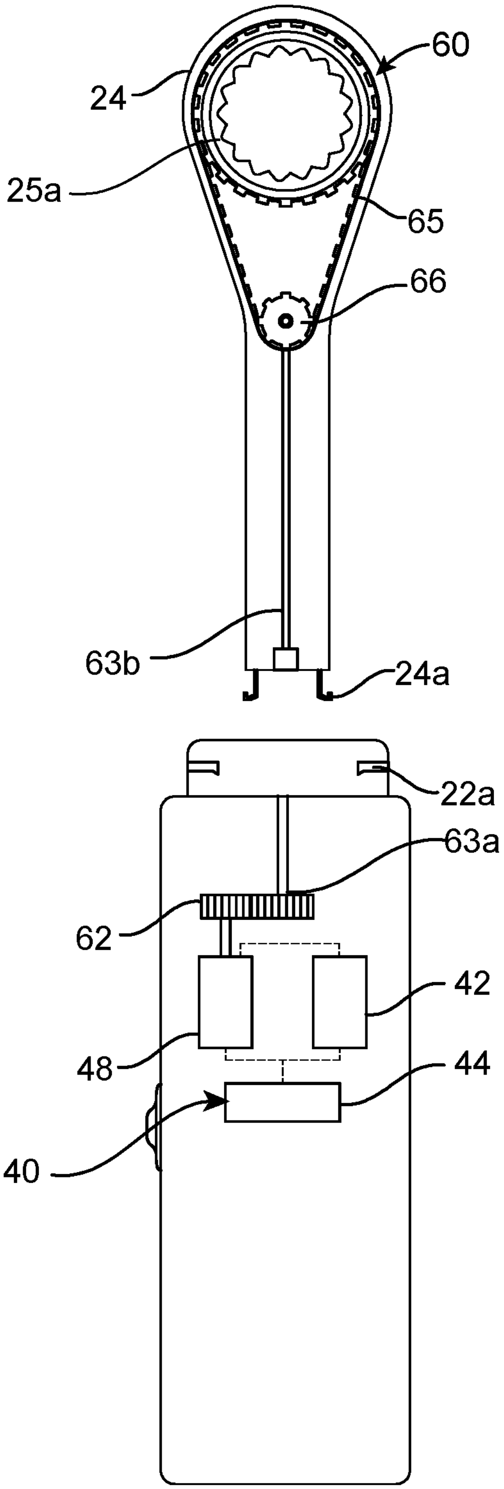
FIG. 4 is a representation of a front cross-sectional view of the battery powered automatic wrench according to the present invention.

Best shown in FIGS. 2-4, the wrench assembly 20 includes a handle 22, receiving members **22*a*, a wrench head 24, and inserting members 24*a*. The handle 22 may be made of a sturdy, resistant, durable material. Handle 22 may be made of plastic, metal, different varieties of steel, or any other suitable material for manufacturing wrenches as known in the art. Handle 22 may have an elongated cylindrical shape. Nonetheless, in other embodiments, the handle 22 may have any regular prism shape, irregular prism shape, or the like. The handle 22 may be ergonomic. The handle 22 may be hollow. The handle 22 may have an uppermost end that may receive the wrench head 24 as depicted in FIG. 4. Said uppermost end of said handle 22 may be cylindrical and may be smaller in diameter than said handle 22 as appreciated in FIG. 2. The receiving members 22*a* may be internally located in the handle 22 at said uppermost end. Wherein said receiving members are disposed horizontally. The receiving members 22*a* may be placed opposite to each other. Each receiving member 22*a* may have a pointed distal end that faces the interior of the handle 22. The handle 22 may be removably attached to the wrench head 24. The wrench head 24 may be made of a resistant, sturdy, and durable material. In other embodiments, the wrench head 24 may be made of polymers, aluminum, stainless steel, steel, metal alloys, or any variation or combination thereof. The wrench head 24 may have a bottom portion and a top portion, wherein the bottom portion may have an elongated cylindrical shape, whereas the top portion may have a circular shape as shown in FIGS. 2-5. Furthermore, the wrench head 24 presents a tapered transition from the top portion to the bottom portion. The wrench head 24 may include inserting members 24*a* that extend downward from the bottommost end of said wrench head 24 past its periphery. The inserting members 24*a* are parallel to each other. When said wrench head 24 is mounted to said handle 22, the theinserting members are received and secured by said receiving members 22*a* as depicted in FIG. 3. Said wrench head 24 may include a driving element 25 at said top portion. In one embodiment, said driving element may be a box end 25*a* as known in the art. The box end 25*a* may be defined as an open end configured to fully surround and grip the head of the bolt, nut, or any other suitable fastener. The box end 25*a* provides a greater contact area, thereby permitting more torque to be applied in operating conditions. In various embodiments, the box end 25*a* may be a 12 point end, a 6 point end, or any other suitable geometry thereof as known in the art. It should be understood that more points inside the box end 25*a* leads to smaller degree increments. For instance, a 12 point may permit a 30° increment, whereas the 6 point may permit 60° increments. In various embodiments, the box end 25*a* may be a flat type or an offset type as known in the prior art. In the present invention, the driving element 25 in its various embodiments may rotate as indicated by line A in FIGS. 2-3. Said driving element 25 in its various embodiments may be actuated by means of the electrical and transmission assembly (40 and 60) or any variation thereof. The driving element 25 in the form of said box end 25*a* may be internally connected to said transmission assembly 60**.

As illustrated in FIGS. 2-4 the electrical assembly 40 includes a battery 42, a controller 44, a display 46, a motor 48, control buttons 49. The battery 42 may be internally placed in the handle 22. Battery 42 may be electrically connected to the motor 48, the display 46, the controller 44, wherein the connection may be electric wires. The battery 42 may provide electrical energy. In one embodiment, the battery 42 may be a DC battery. In another embodiment, the battery 42 may be an AC battery. Battery 42 may be a primary battery or a secondary battery. Primary batteries are single use or disposable whereas secondary batteries are a type of battery that can be recharged. In a suitable embodiment battery 42 is a lithium-ion battery. Nevertheless, in another embodiment battery 42 may be a Li-ion battery, or the like. The motor 48 may be internally located in the handle 22. The motor 48 may be a DC motor or an AC motor. Motor 48 may convert the electrical energy provided by the battery 42 into mechanical energy that is to be transferred to the driving element 25 by means of the transmission assembly 60. The controller 44 may be connected to the battery 42, to the display 46, and to the motor 48. The controller 44 may be an electrical component that controls the torque and speed delivered by the motor. Depending on the type of motor, the controller 44 may be a torque controller for DC motors or for AC motors. In one embodiment the controller 44 may regulate the current that passes through the motor 48. In another embodiment wherein the motor 48 may be an AC motor, the controller 44 may use a direct torque control (DTC). The display 46 may be located on an exterior surface of the handle 22. The display 46 may be a touch sensitive display. The display 46 may be a resistive touchscreen, a capacitive touchscreen, surface acoustic wave touch screen, infrared, touchscreen, optical imaging touchscreen, or any other suitable touchscreen as known in the art. A user may be able to select a predetermined amount of torque that the motor 48 may deliver using the display 46. The display 46 may send a signal to the controller 44 with the reference torque selected by the user. The controller 44 may drive the motor 48 to deliver the selected amount of torque. Additionally, the behavior of the present invention may be governed by said control buttons 49, which may enable the user to turn on/off the claimed device, select the direction of rotation of the driving element 25, and the torque to be applied, wherein the foregoing actions executed by the control buttons 49 are mentioned for illustrative purposes, and should not be considered in a limiting sense.

The transmission assembly 60 may include motor gears 62, a first spindle **63*a*, a second spindle 63*b* a coupler 64, a toothed belt 65, and a head gears 66, wherein all elements may be mechanically connected to each other. The motor gears 62 may be connected to the motor 48 and to the first spindle 63*a*. Motor gears 62, and the first spindle 63*a* may be located within the handle 22 as shown in FIG. 2. Motion generated by the motor 48 may be transmitted to the spindle (63*a*, 63*b*) by means of the motor gears 62. When said handle 22 is connected to the wrench head 24, the coupler 64 located inside the wrench head 24 may receive the first spindle 63*a* permitting to transfer motion generated by the motor from the elements inside the handle 22 to the elements inside the wrench head 24 (second spindle 63*b*, toothed belt 65, and head gears 66). The coupler 64 may be connected to the second spindle 63*b*. The second spindle 63*b* may transmit motion to one of the head gear 66. The head gear 66 may be connected to the toothed belt 65. The toothed belt 65 may be a flexible belt with teeth molded onto its inner surface. The toothed belt 65 permits to transfer motion from the head gear 66 that receives motion from the second spindle 63*b* to the box end 25*a*. It should be understood that the box end 25*a* may have an inner surface and an outer surface, wherein said inner surface has a suitable geometry to receive fasteners therein; the outer surface may be toothed to be operatively connected to said toothed belt 65 as depicted in FIG. 4**.

Figure 5:
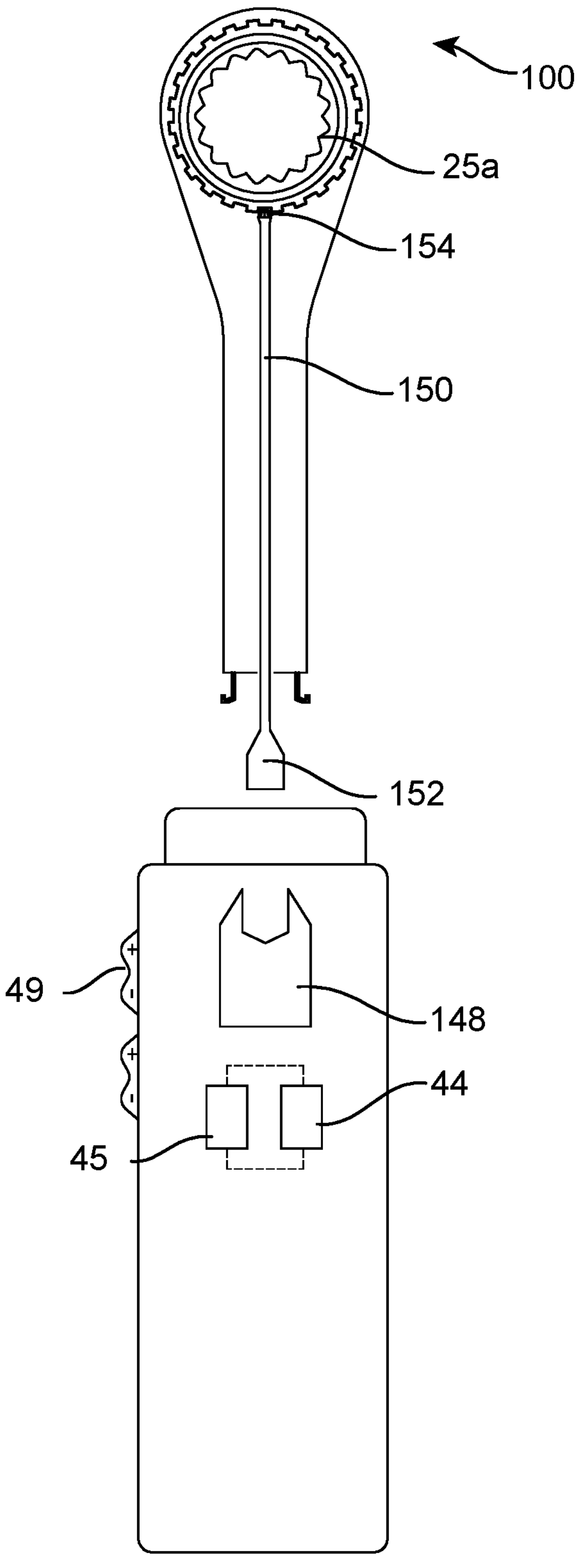
FIG. 5 illustrates an exemplary embodiment of the present invention 100.

Exemplary embodiment 100 may be best illustrated in FIG. 5, showing a motor that may be formed together with a chuck 148, as widely known in the art, to receive and secure a shank. The motor with chuck 148, the controller 44 and the torque converter 45 may be disposed inside the handle 22 in the present exemplary embodiment. The motor with chuck 148 may be facing towards the wrench head 24. Inside the wrench head 24 a shaft 150 may be horizontally disposed. The shaft 150 may have a bottom distal end with a shank 152 built thereat, and a pinion 154 built in the opposite distal end. The shank 152 may be volumetrically suitable to be received and secured inside the chuck 148. Inside the wrench head 24 a drive wheel 350 may be operatively connected to the square drive **24*b* to transmit motion thereto. As shown in illustrative FIG. 7, the pinion may interact with the drive wheel 350 to transmit rotation coming from the motor with chuck 320 to actuate the driving element (box end 25*a*). The present exemplary embodiment 100 may also include control buttons 49** for the user to enter desired parameters.

Figure 6:
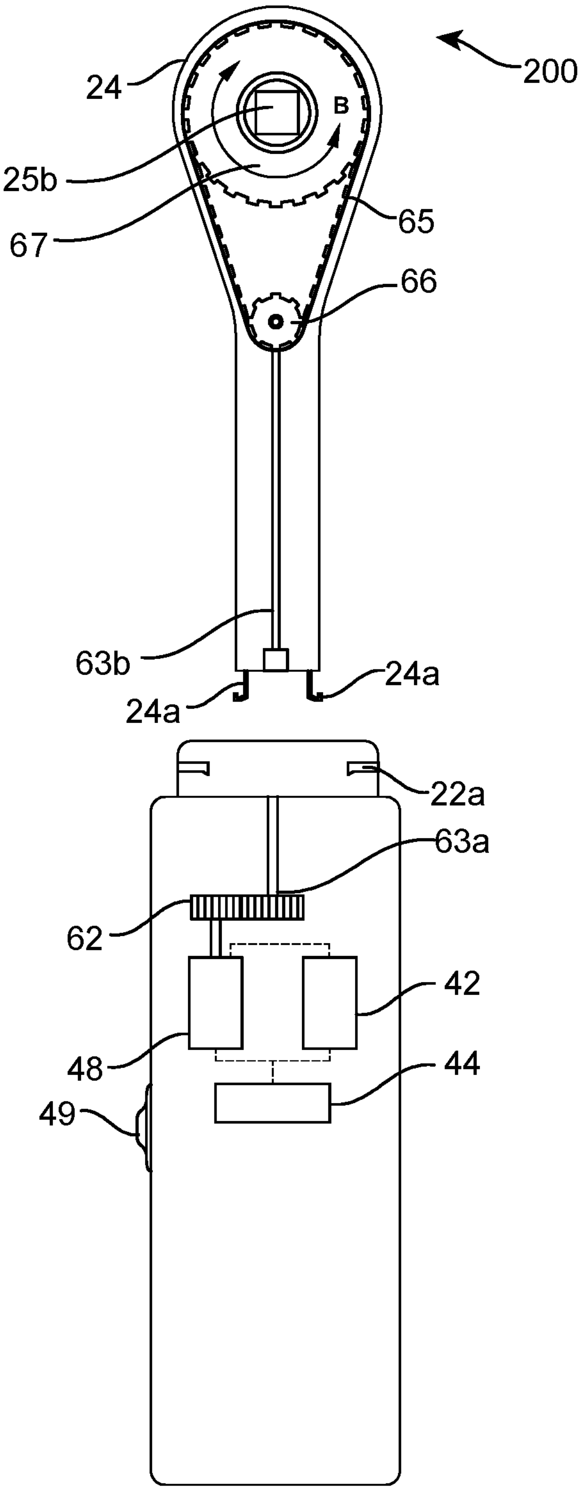
FIG. 6 depicts an exemplary embodiment 200 of the present invention.
Figure 7:
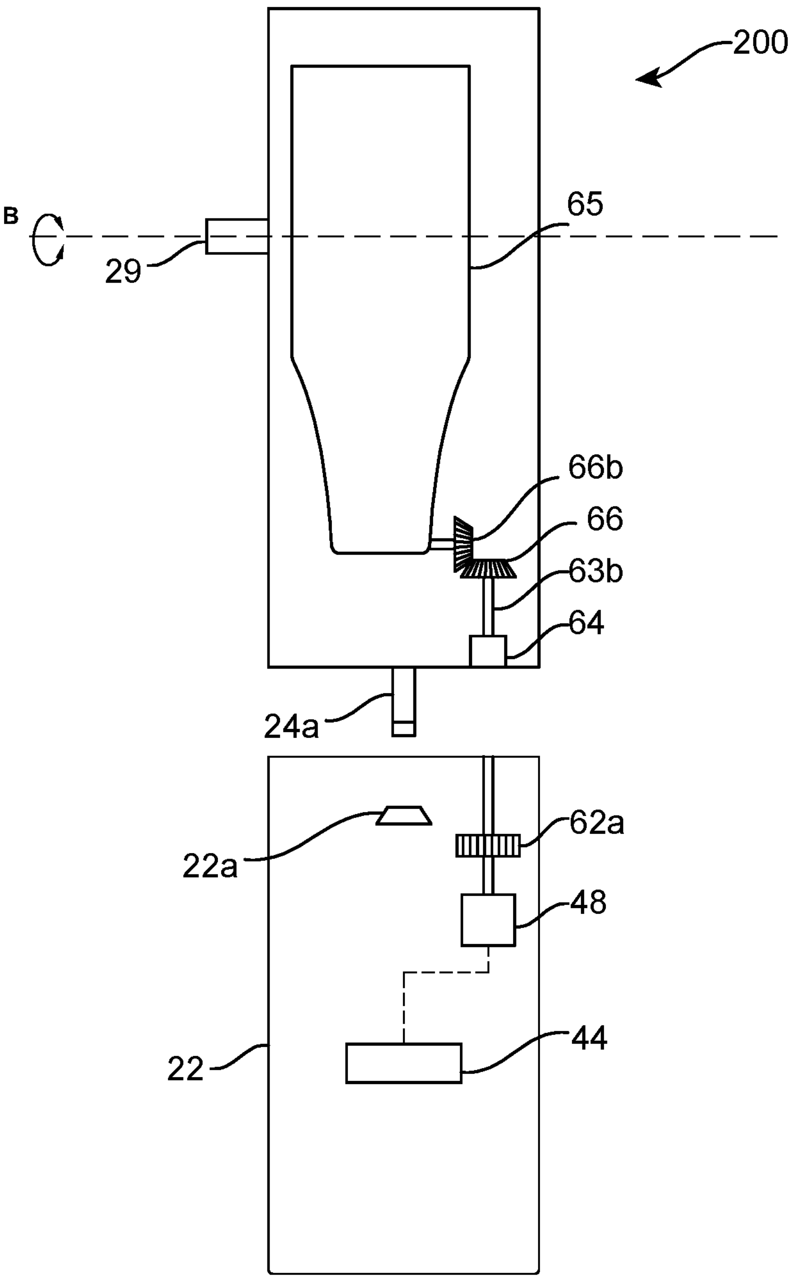
FIG. 7 depicts a lateral cross sectional view of exemplary embodiment 200 of the present invention.

Exemplary embodiment 200 of FIG. 6, presents the driving element 25 in the form of a square drive **25*b* which may be located on the wrench head 24. The square drive 25*b* may be a square shaped element that extends outwardly from the wrench head 24 a predetermined distance. The square drive 25*b* may have a suitable geometry, as widely known in the art, to receive a variety of sockets with different sizes that may be used depending on the application that the present invention may perform. The square drive 25***b* as hereby presented, may be internally and mechanically connected to a driven gear 67 of the transmission assembly 60. The present exemplary embodiment 200 is a variation of the one presented in FIG. 4. In said FIG. 4, the box end 25*a* interacts with the toothed belt 65, whereas in the present exemplary embodiment 200 the toothed belt 25 is operatively connected to the driven gear 67 to rotate the square drive 25*b* as conveyed by line B. FIG. 7, represents a lateral sectioned view of embodiment 200, to appreciate how the head gear 66 is connected to a supplementary gear 66*b*, where both gears (66, 66*b*) intersect at a 90 degree angle forming a widely known bevel gear configuration.

Figure 8:
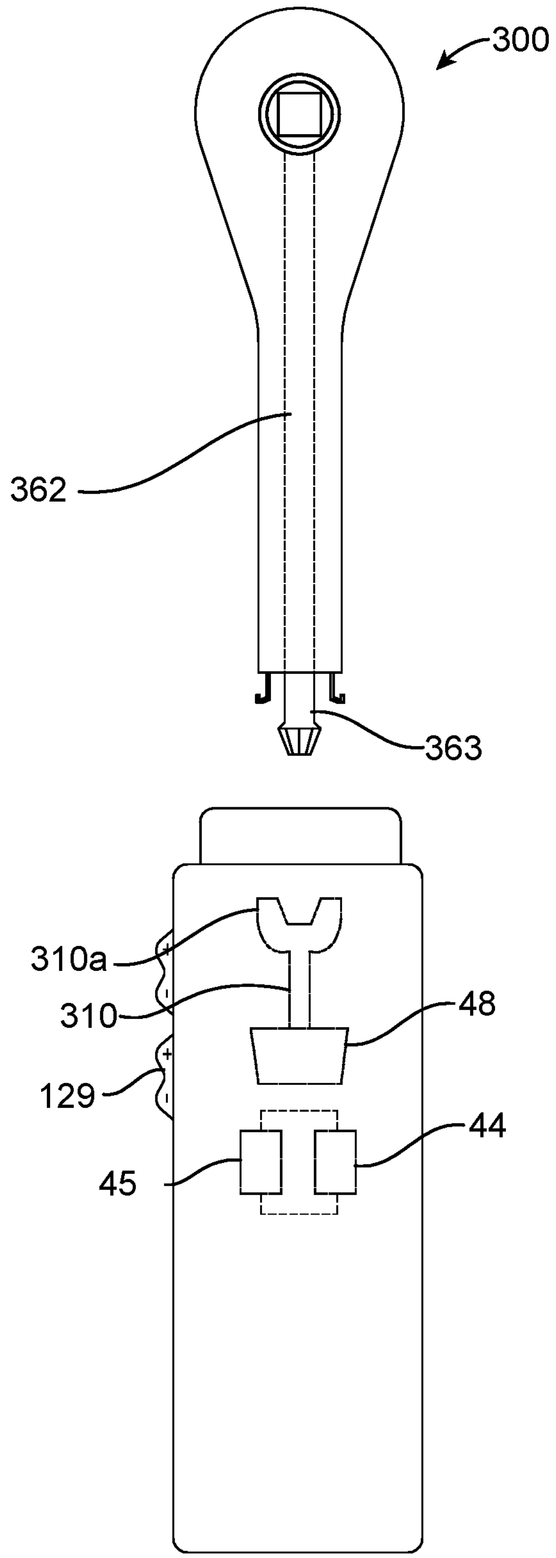
FIG. 8 depicts an exemplary embodiment 300 of the present invention.
Figure 8A:
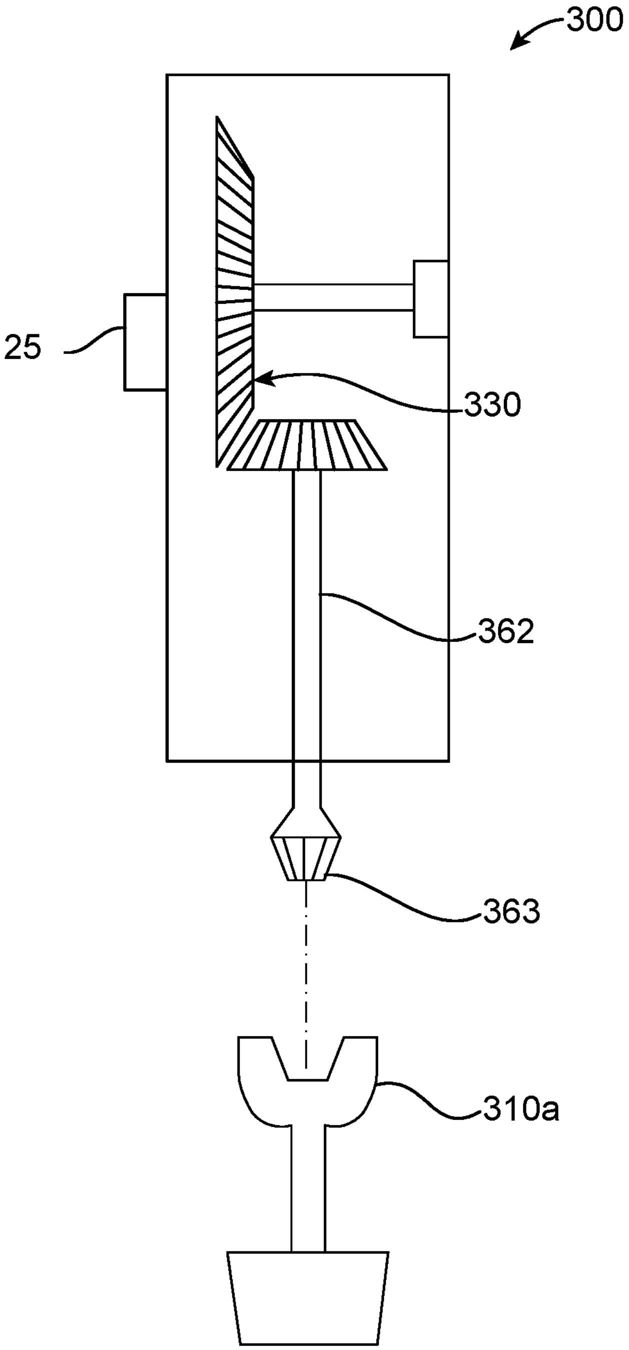
FIG. 8A represents a lateral schematic view of exemplary embodiment 300 of the present invention.

Another exemplary embodiment 300 is depicted in FIG. 8, it should be understood that FIG. 8 is a schematic representation of the actual elements. In the present embodiment 300 the motor 48 as described above that may be further connected to a transmission element 310 that may be an elongated pole with a female gear 310*a* at a distal end opposite to said motor 48. In the present exemplary embodiment 300, the behavior of the motor 48 may be governed by the controller 44 and by a torque converter 140 as widely known in the art. In the present exemplary embodiment, the handle 22 may also include control buttons 49 disposed thereon, wherein the control buttons 49 may be operatively connected to the controller 44 and the torque converter 140 as to permit a user to manually manipulate the torque exerted by the present invention depending on the application. Motion from the motor 48 is transmitted to the driving element 25 in its various embodiments (25*a*, 25*b*) by means of a rotating driven shaft 362 that has a male gear 363 at a bottommost distal end that is received by the transmission element 310 and interacts with the female gear 310*a* to transmit motion when the handle 22 is secured to the wrench head 24. As illustrated in FIG. 8A the driven shaft 362 at a topmost distal end may include a gear that interacts with a gear disposed inside the wrench head to transmit motion to said driving element 25. As both gears are mounted on shafts that are 90 degrees apart, a bevel gear configuration 330 may be used as it presents a suitable geometry to drive motion from orthogonal axles.

Figure 9:
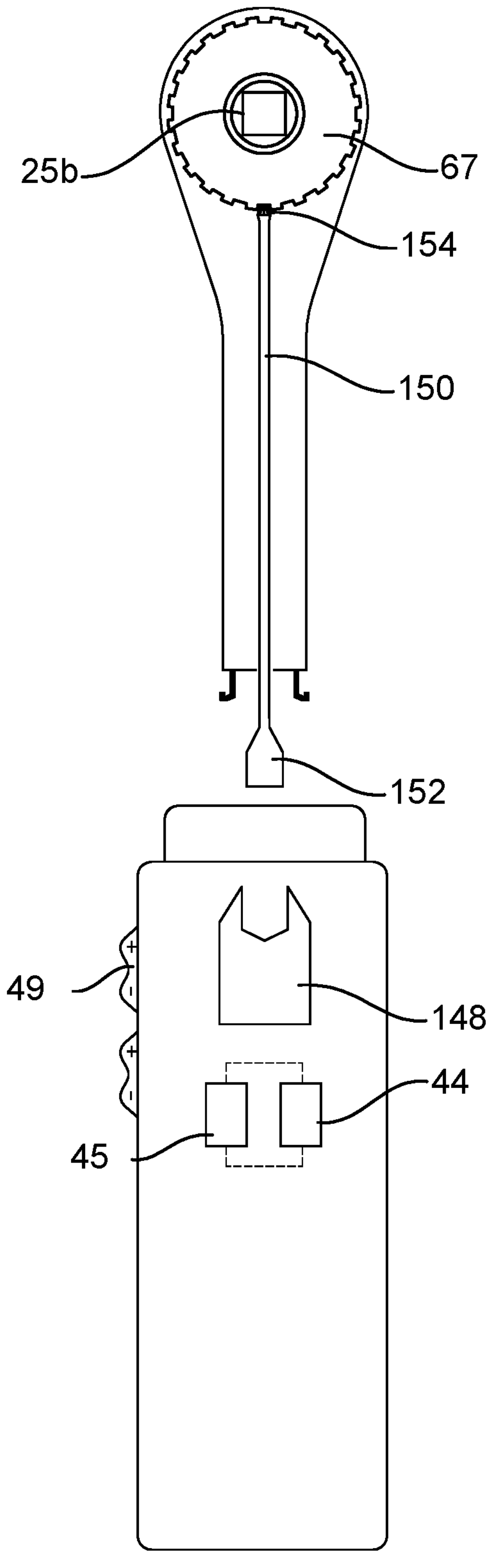
FIG. 9 represents a front cross-sectional view of an exemplary embodiment of the present invention.

FIG. 9 represents a variation of the embodiment of FIG. 5 but replacing the box end 25*a* with said square drive 25*b* and the driving gear 67. It should be understood that the embodiments above described are not mutually exclusive from one another and that elements corresponding to one exemplary embodiment can be used in various configurations such as the case represented between FIGS. 9 and 5, or between FIGS. 6 and 4.

Figure 10:
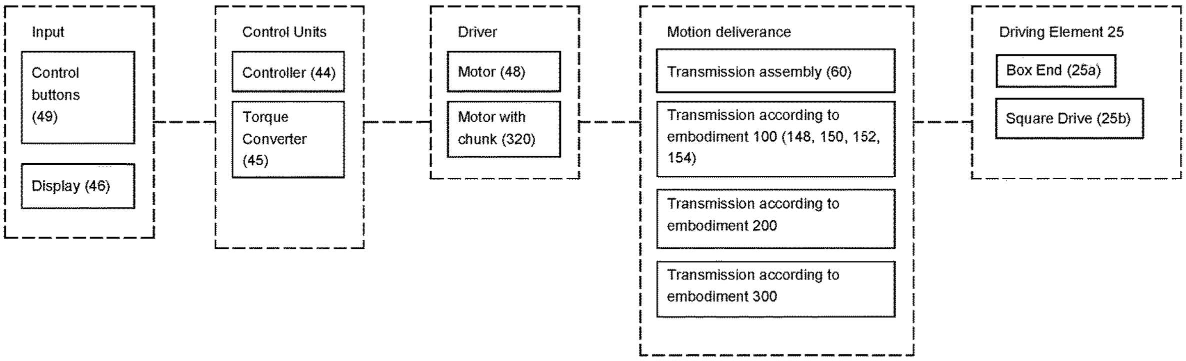
FIG. 10 is a representation of a schematic view of the present invention including the various elements of the herein described exemplary embodiments.

Referring now to FIG. 10 showing an exemplary schematic diagram of the relationship between the various elements described above from the input stage where a user introduces a desired torque to be applied by means of the control buttons (49) and/or said display 46. Based on the input, the control units are configured to output an adequate electrical signal that will drive the motor to present the desired torque and a controlled behavior. The motion is transmitted to the driving element 25 in its various exemplary embodiments (25*a*, 25*b*) by means of a motion deliverance system which encompass, but not in a limiting sense, the diverse kinds of mechanical elements as described above, which work in concert to transmit motion. Finally, the driving element has an adequate geometry to receive bolts, nuts, or the like, in order to exert the torque as inputted by the user.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A battery powered automatic wrench, comprising:

a wrench assembly including a handle that is removably attached to a wrench head, said handle has an elongated cylindrical shape;

an electric assembly including a battery and a motor located within said handle, said motor delivers a rotational motion that is transmitted to the wrench head by means of a transmission assembly, a display and control buttons are located on said handle and are electrically connected to said motor, said display and control buttons permit to increase or decrease a speed and a torque that said motor delivers, said battery provides electrical energy to said motor; and the transmission assembly including gears, shafts and spindles mechanically connected to each other to transmit controlled motion from the motor to a driving element located at a top portion of said wrench head; wherein said transmission assembly further includes motor gears, a first spindle, a second spindle, a head gear and a toothed belt, said motor gears are operatively connected to the motor, said first spindle is connected to said motor gears, the second spindle, the head gears and the toothed belt are located inside the wrench head; the first spindle receives and transmits motion from the motor to the second spindle, the second spindle transmits motion to the head gears, wherein said head gears are linked by the toothed belt, thereby actuating the driving element operatively connected to said head gear.

2. The battery powered automatic wrench of claim 1, wherein said handle has receiving members therein at a top distal end thereof.

3. The battery powered automatic wrench of claim 2, wherein said wrench head has inserting members that are removably secured to the receiving members.

4. The battery powered automatic wrench of claim 1, wherein said electrical assembly further includes a controller that is electrically connected to the motor, wherein said controller is an electrical component that controls the torque and speed delivered by the motor.

5. The battery powered automatic wrench of claim 1, wherein said transmission assembly includes a coupler internally disposed in the head wrench, the coupler is connected to the second spindle, when said handle and said wrench head are attached, the coupler receives the first spindle and transmits motion therefrom to the second spindle.

6. The battery powered automatic wrench of claim 1 further includes a bevel gear configuration to transmit motion from the motor to the driving element.

7. The battery powered automatic wrench of claim 1 further includes a shank and chuck configuration, wherein said motor has a chuck that receives a shank built at a distal end of a shaft disposed within the wrench head, at an opposite distal end the shaft has a pinion that cooperates with said driving element.

8. The battery powered automatic wrench of claim 1, wherein the motor is connected to a transmission element that is an elongated pole with a female gear at a distal end opposite to said motor, a rotating driven shaft has a male gear at a bottommost distal end that is received by the transmission element and interacts with the female gear to transmit motion when the handle is secured to the wrench head.

9. The battery powered automatic wrench of claim 1, wherein said driving element is a drive square.

10. The battery powered automatic wrench of claim 1, wherein said driving element is a box end.

11. A battery powered automatic wrench, comprising:

a wrench assembly including a handle that is removably attached to a wrench head, said handle has an elongated cylindrical shape, said handle has receiving members therein that receive inserting members of the wrench head;

an electric assembly including a battery and a motor located within said handle, said motor delivers a rotational motion that is transmitted to the wrench head by means of a transmission assembly, a display and control buttons are located on said handle and are electrically connected to said motor, said display and control buttons permit to increase or decrease a speed and a torque that said motor delivers, said battery provides electrical energy to said motor, said display and control buttons are electrically connected to a controller, said display and control buttons are configured to permit a user to select the speed and torque to be delivered at a driving element, the controller connected to the display receives a signal and drives the motor to provide a selected speed and torque; and the transmission assembly including motor gears, a first spindle, a second spindle, a head gear and a toothed belt, said motor gears are connected to the motor, said first spindle is connected to said motor gears, the second spindle, the head gears and the toothed belt are located inside the wrench head, the first spindle receives and transmits motion from the motor to the second spindle by means of a coupler, the second spindle transmits motion to a head gear, wherein said head gear is linked by the toothed belt, the driving element internally connected to the transmission assembly.

12. The battery powered automatic wrench of claim 10, wherein said driving element is a drive square.

13. The battery powered automatic wrench of claim 10, wherein said driving element is a box end.

14. A battery powered automatic wrench, consisting of:

a wrench assembly including a handle that is removably attached to a wrench head, said handle has an elongated cylindrical shape, said handle has receiving members therein that receives inserting members of the wrench head;

an electric assembly including a battery and a motor located within said handle, said motor delivers a rotational motion that is transmitted to a driving element of the wrench head by means of a transmission assembly, a display and control buttons are located on said handle, said display and control buttons permit to increase or decrease a speed and a torque that said motor delivers, said battery provides electrical energy to said motor, said display and control buttons are electrically connected to a controller, the controller connected to the display and control buttons receive an input signal and drives the motor to provide a selected speed and torque; and the transmission assembly including motor gears, a first spindle, a second spindle, a head gear and a toothed belt, said motor gears are connected to the motor, said first spindle is connected to said motor gears, the second spindle, the head gears and the toothed belt are located inside the wrench head, the first spindle receives and transmits motion from the motor to the second spindle by means of a coupler, the second spindle transmits motion to the head gear, wherein said head gear is linked to the toothed belt, motion starting from the motor and consecutively controlled is deliver to the driving element.

* * * * *